(12) United States Patent
Puckett et al.

(10) Patent No.: US 10,948,657 B2
(45) Date of Patent: Mar. 16, 2021

(54) BICHROMATIC CHIP TO FREE-SPACE GRATING COUPLER

(71) Applicant: Honeywell International Inc., Morris Plains, NJ (US)

(72) Inventors: Matthew Wade Puckett, Scottsdale, AZ (US); Chad Hoyt, Roseville, MN (US); Chad Fertig, Bloomington, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/530,595

(22) Filed: Aug. 2, 2019

(65) Prior Publication Data
US 2021/0033794 A1   Feb. 4, 2021

(51) Int. Cl.
*G02B 6/293* (2006.01)
*G02B 6/35* (2006.01)

(52) U.S. Cl.
CPC ....... *G02B 6/29329* (2013.01); *G02B 6/3596* (2013.01)

(58) Field of Classification Search
CPC .......................... G02B 6/29329; G02B 6/3596
See application file for complete search history.

(56) References Cited

U.S. PATENT DOCUMENTS

| | | | |
|---|---|---|---|
| 5,969,863 A | * | 10/1999 | Staub .................. G02B 5/1823 283/902 |
| 6,014,192 A | | 1/2000 | Lehureau et al. |
| 6,553,162 B1 | | 4/2003 | Okayama |
| 8,215,815 B2 | | 7/2012 | Meir et al. |
| 8,237,175 B2 | | 8/2012 | Moustakas et al. |
| 8,272,758 B2 | | 9/2012 | Meir et al. |

(Continued)

FOREIGN PATENT DOCUMENTS

WO   WO-2018024975 A1 *  2/2018   ......... G02B 6/12004

OTHER PUBLICATIONS

European Patent Office, "Extended European Search Report from EP Application No. 20182734.2", from Foreign Counterpart to U.S. Appl. No. 16/530,595, dated Dec. 16, 2020, p. 1 through 12, Published: EP.

(Continued)

*Primary Examiner* — Leslie C Pascal
(74) *Attorney, Agent, or Firm* — Fogg & Powers LLC

(57) ABSTRACT

A bichromatic grating coupler comprises a two-dimensional diffraction grating structure, including a first sub-grating having a first periodic structure and a second sub-grating having a second periodic structure. The first and second sub-gratings are superimposed with respect to each other in the diffraction grating structure. A first optical port is coupled to the diffraction grating structure along a first direction, and a second optical port is coupled to the diffraction grating structure along a second direction. The first optical port is configured to direct a first light beam having a first wavelength to the diffraction grating structure, such that the first light beam is diffracted in a first direction by the first sub-grating. The second optical port is configured to direct a second light beam having a second wavelength to the diffraction grating structure, such that the second light beam is diffracted in a second direction by the second sub-grating.

13 Claims, 11 Drawing Sheets

(56) References Cited

U.S. PATENT DOCUMENTS

| | | |
|---|---|---|
| 8,414,174 B2 | 4/2013 | Fine et al. |
| 9,377,623 B2 | 6/2016 | Robbins et al. |
| 2002/0126942 A1 | 9/2002 | Evans |
| 2004/0131312 A1* | 7/2004 | Ohlander ............ G02B 6/4215 385/37 |
| 2004/0184156 A1* | 9/2004 | Gunn, III ............... G02B 6/124 359/629 |
| 2010/0119229 A1 | 5/2010 | Roelkens et al. |
| 2011/0008001 A1 | 1/2011 | Doerr |
| 2011/0103743 A1 | 5/2011 | Baets et al. |
| 2012/0177060 A1* | 7/2012 | Lipson ............... G02B 6/12007 370/464 |
| 2016/0119057 A1 | 4/2016 | Mekis et al. |
| 2017/0026123 A1 | 1/2017 | DeDobbelaere et al. |
| 2018/0149791 A1 | 5/2018 | Urness et al. |
| 2018/0252869 A1 | 9/2018 | Ayres et al. |
| 2019/0101760 A1 | 4/2019 | Ayres et al. |
| 2019/0140415 A1* | 5/2019 | Sun .................... H04J 14/0256 |
| 2019/0170938 A1* | 6/2019 | Plantier .............. G02B 6/12002 |
| 2020/0150241 A1* | 5/2020 | Byrnes .................. G01S 7/4815 |

OTHER PUBLICATIONS

Fu et al. "1×8 Supergrating wavelength-division demultiplexer in a silica planar waveguide", Optics Letters, Nov. 1, 1997, p. 1627 through 1629, vol. 22, No. 21, Optical Society of America.

* cited by examiner

BICHROMATIC CHIP TO FREE-SPACE GRATING COUPLER

BACKGROUND

Low size, weight, and power (SWaP), environmentally robust, mass producible sensors based on laser cooled atoms would be of enormous commercial importance. For example, the unparalleled stability of atom-based clocks, gyroscopes, and accelerometers could enable precise timing and navigation in Global Positioning System (GPS)-denied environments.

A key functional component of compact atomic sensors based on laser cooled atoms is the optical system which emits, conditions, and directs the free-space laser beams required for collecting, cooling, and trapping clouds of atoms. For example, compact atomic sensors may require many laser beams of different wavelengths to precisely intersect one another inside an ultra high vacuum cell chamber containing an atomic vapor. Also, the laser beam parameters, such as the Gaussian parameters (waist position and divergence angle) and polarization, may need to be precisely matched between many different beams.

Currently, state of the art atomic sensor optical systems utilize one or more "bulk" optical components (e.g., lenses, mirrors, polarizers, and other optics) as optical elements. Compact atomic sensors are difficult to batch fabricate at low cost if the optical assemblies must be aligned one optic at a time, and/or if there is no easy method for validating the alignment before their positions are permanently fixed relative to the ultra high vacuum cell chamber into which the beams are projected.

To enable mass production of atomic sensor optical systems, enabling robust performance in various environments, a method of projecting multiple wavelengths of light from a single emission point on a planar surface is required. Furthermore, such a method should be compatible with the use of integrated waveguide optical systems.

SUMMARY

A bichromatic grating coupler comprises a two-dimensional diffraction grating structure, which includes a first sub-grating having a first periodic structure in the diffraction grating structure, and a second sub-grating having a second periodic structure in the diffraction grating structure. The first sub-grating and the second subgrating are superimposed with respect to each other in the diffraction grating structure. A first optical port is coupled to the diffraction grating structure along a first direction, and a second optical port is coupled to the diffraction grating structure along a second direction that is different than the first direction. The first optical port is configured to direct a first light beam having a first wavelength to the diffraction grating structure, such that the first light beam is diffracted in a first direction by the first sub-grating. The second optical port is configured to direct a second light beam having a second wavelength to the diffraction grating structure, such that the second light beam is diffracted in a second direction by the second sub-grating.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
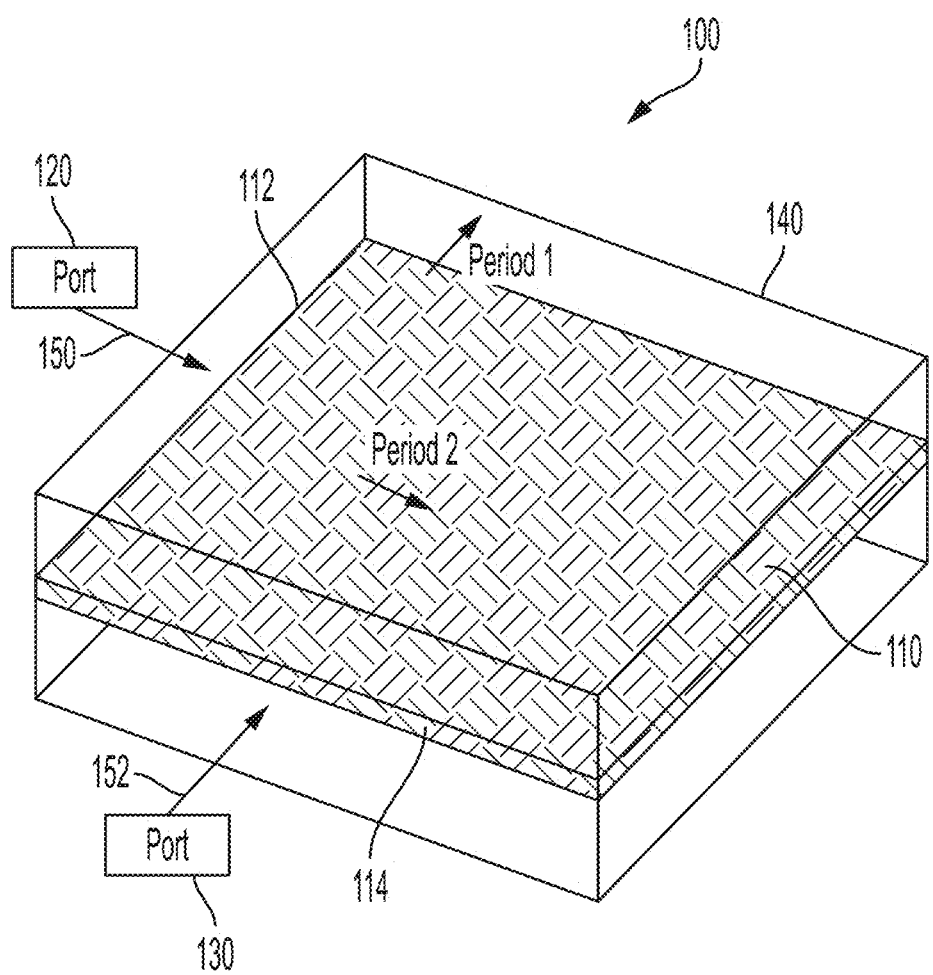
FIG. 1 is a schematic orthogonal view of a bichromatic grating coupler, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A bichromatic grating coupler is described herein, which provides enhanced chip to free-space optical communications, in which information is transmitted using optical signals. The bichromatic grating coupler is compatible with the use of integrated photonic circuits to generate and direct laser beams. The bichromatic grating coupler can be advantageously implemented as a component in various sensor applications, such as compact atomic sensors.

Compact atomic sensors can be made more robust if the optical emitters have their key optical parameters, such as beam polarization, divergence, and pointing fixed by their fabrication. Compared to the state of the art approach, in which optical systems for atomic sensors employ one or more bulk optics to emit, condition, and direct the laser beams, the present approach results in far more robust, smaller, and easier to manufacture atomic sensors based on laser cooled atoms.

In some cold atom sensors, such as optical lattice clocks, it is also critical to produce another atom trap (dipole trap) that is accurately overlapped with the first trap (magneto-optical trap), with matched pointing, polarization, and Gaussian beam parameters. It is critical for optical dipole traps to be well overlapped with the geometrical intersection of the trapping beams to achieve a large number of cold, trapped atoms, which directly correlates to the improved performance of the cold atom based sensor. The present bichromatic grating coupler permits laser beams of two colors to emit from the same point, and so guarantee perfect overlap. For example, the bichromatic grating coupler can be implemented in laser cooled strontium optical lattice clock cold atom-based sensing applications.

The bichromatic grating coupler generally includes a two-dimensional diffraction grating structure comprising a first sub-grating having a first periodic structure, and a second sub-grating having a second periodic structure. The first sub-grating and the second subgrating are superimposed with respect to each other in the diffraction grating structure. A first optical port is coupled to the diffraction grating structure along a first direction, and a second optical port is coupled to the diffraction grating structure along a second direction that is different than the first direction.

A light beam of a first wavelength incident upon the diffraction grating structure from the first optical port will be diffracted in a first direction, determined by the first sub-grating with an appropriate K-vector. A light beam of a second wavelength incident upon the diffraction grating structure from the second optical port will be diffracted in a second direction, determined by the second sub-grating with its own unique K-vector. Each of the two light beams interacts with one respective sub-grating and is diffracted according that grating's K-vector.

Accordingly, there is zero cross-talk in the bichromatic grating coupler. That is, there is no interaction of the light beam of the first wavelength with the second sub-grating, and there is no interaction of the light beam of the second wavelength with the first sub-grating. For example, there is no resultant coherent emission of a first laser beam from the second sub-grating, and no resultant coherent emission of a second laser beam from the first sub-grating. This provides for efficient projection of light from an integrated optical circuit of different wavelengths into overlapping regions of free-space. In addition, the direction of emission of the two light beams may be independently controlled by modifying either of the two sub-gratings.

The bichromatic grating coupler can be fabricated as part of a chip-scale waveguide system through any of several well-established processes. The two optical ports can be fabricated as input waveguides for two optical sources with two unequal wavelengths. The individual sub-gratings can be written into the upper or lower boundary of the waveguide layer; can be written into the sidewall of the waveguide layer; can be written into the upper cladding layer surrounding the waveguide layer; and both of the two sub-gratings can be written into any combination of the above. Alternatively, the two sub-gratings may be written in two separate fabrication steps, allowing for their corresponding etch depth and resulting grating strength to be independently controlled.

The present approach can be used to change the design of the grating structures to provide additional degrees of freedom, which allows for changing characteristics or parameters of the output mode. For example, the output beams can be focused, defocused, or can have large or small profiles. The present approach also allows a bichromatic lens to be made that has the same focal length for two different wavelengths; and a two color planar emitter can be implemented.

The bichromatic grating coupler can also be implemented for use in a reverse direction. For example, two input wavelengths that are co-propagating in free space can be taken in and split into two output waveguides by the bichromatic grating coupler. In addition, wavelength multiplexing via multiple wavelengths emitted from a single biochromatic grating emitter can be implemented.

Further details of various embodiments are described hereafter with reference to the drawings.

FIG. 1 is a schematic orthogonal view of a bichromatic grating coupler 100, according to one embodiment. The bichromatic grating coupler 100 comprises a two-dimensional diffraction grating structure 110 that includes a first sub-grating and a second sub-grating that are superimposed with respect to each other. In one implementation, the first and second sub-gratings are oriented orthogonally with respect to each other within diffraction grating structure 110. In other words, the superimposed grating structure is such that one sub-grating is rotated perpendicular with respect to the other sub-grating. In an exemplary implementation, the superimposed grating structure can include two superimposed Bragg gratings.

The first sub-grating has a first K-vector, and the second sub-grating has a second K-vector that is different from the first K-vector. The K-vectors of the first and second sub-gratings are described in further detail hereafter. In some implementations, the grating strength of each of the sub-gratings can be independently controllable.

The bichromatic grating coupler 100 also includes a first optical port 120 that is coupled to diffraction grating structure 110 in a first direction (e.g., x-direction), and a second optical port 130 that is coupled to diffraction grating structure 110 in a second direction (e.g., y-direction) different than the first direction. In one embodiment, first and second optical ports 120, 130 can be implemented as input planar waveguides, which are each coupled to diffraction grating structure 110 at an orthogonal angle with respect to each other. The input planar waveguides can be coupled to diffraction grating structure 110 at respective input sides 112 and 114, such that the waveguides input light in a perpendicular direction with respect to each sub-grating. The bichromatic grating coupler 100 can also include a cladding layer 140 that surrounds diffraction grating structure 110.

The diffraction grating structure 110 can be composed of a material having a higher refractive index, such as silicon nitride (SiN). The cladding layer 140 can be composed of another material having a lower refractive index, such as silicon dioxide ($SiO_2$).

The bichromatic grating coupler 100 is configured such that a laser emission in a guided optical mode 150 of a first wavelength incident upon diffraction grating structure 110 from first optical port 120 will be diffracted in a first direction (period 1) by the first sub-grating. A laser emission in guided optical mode 152 of a second wavelength incident upon diffraction grating structure 110 from second optical port 130 will be diffracted in a second direction (period 2), which may optionally be set equal to the first direction, by the second sub-grating.

In the example embodiment of FIG. 1, bichromatic grating coupler 100 is designed to emit both wavelengths of light into free-space along the surface normal of the chip upon which the grating coupler is fabricated, with orthogonal polarizations. Alternatively, the grating coupler can be designed to emit the two wavelengths in independently controllable directions at any angle into free-space, with similarly controllable degrees of polarization.

Figure 2A:
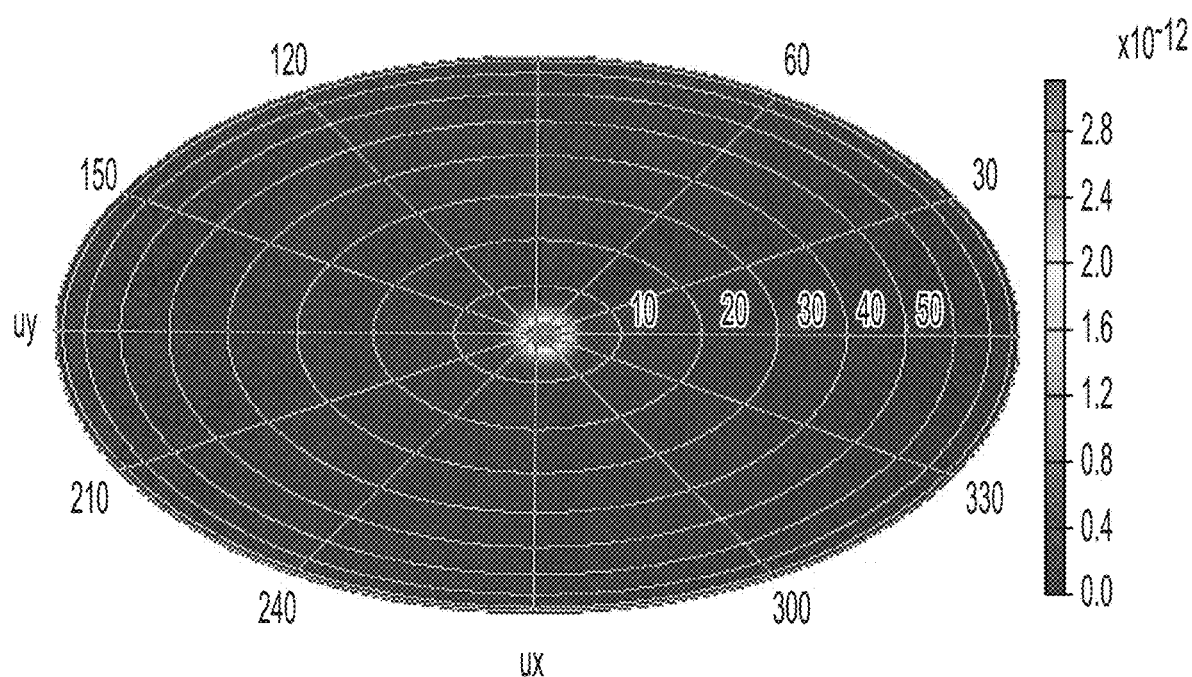
FIGS. 2A and 2B are simulated far-field emission diagrams for the operation of the bichromatic grating coupler of FIG. 1.
Figure 2B:
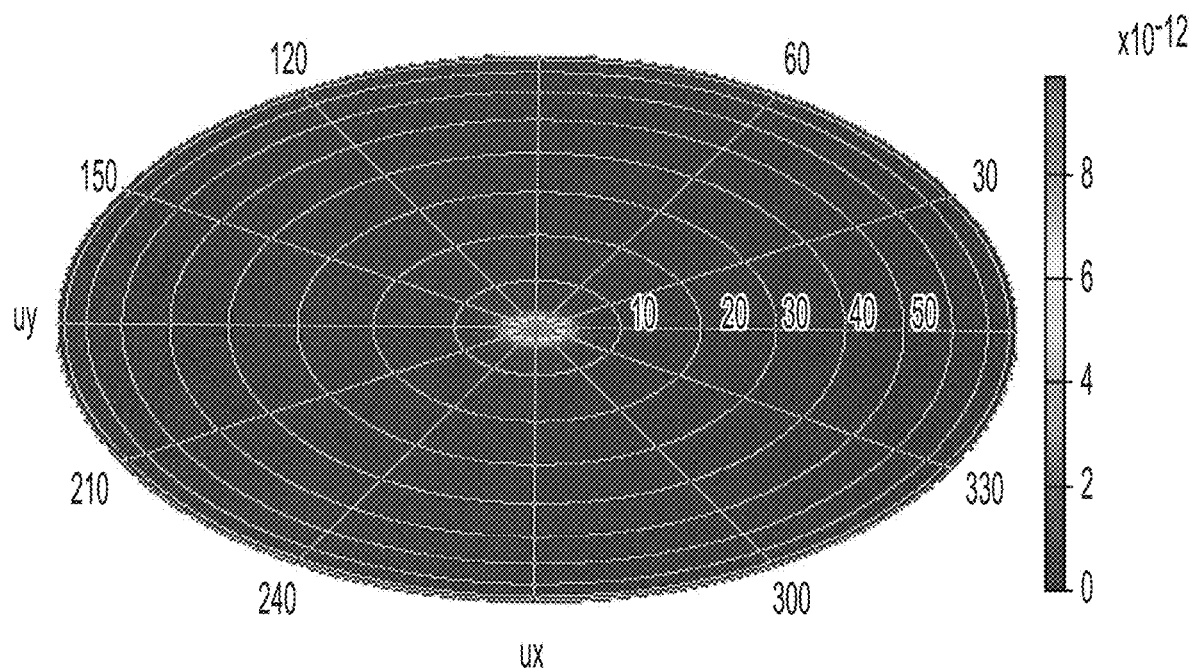

FIGS. 2A and 2B are simulated far-field emission diagrams for the operation of bichromatic grating coupler 100. FIG. 2A shows the simulated far-field emission profile, at surface normal, of a light beam at the first wavelength (e.g., 770 nm) injected into first optical port 120. FIG. 2B shows the simulated far-field emission profile, at surface normal, of a light beam at the second wavelength (e.g., 790 nm) injected into second optical port 130. Each input port only interacts with its intended subgrating, yielding only a single peak in the far-field emission profile for each port.

Figure 3A:
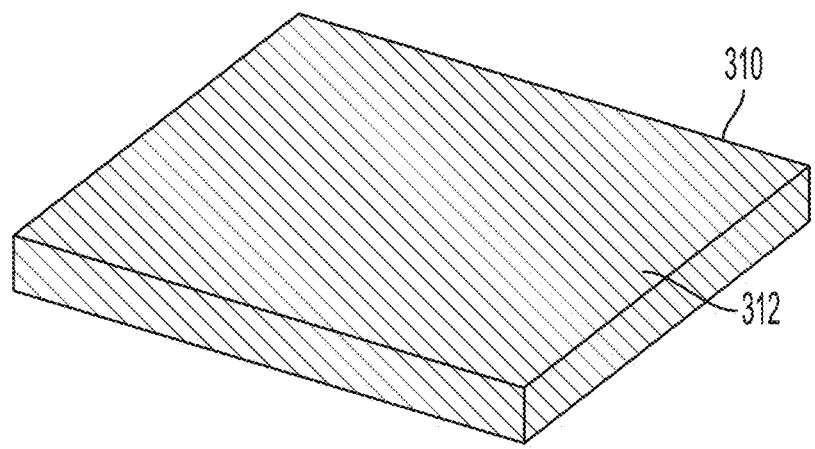
FIGS. 3A-3E are schematic orthogonal views of a method of fabricating a bichromatic grating coupler according to one approach.
Figure 3B:
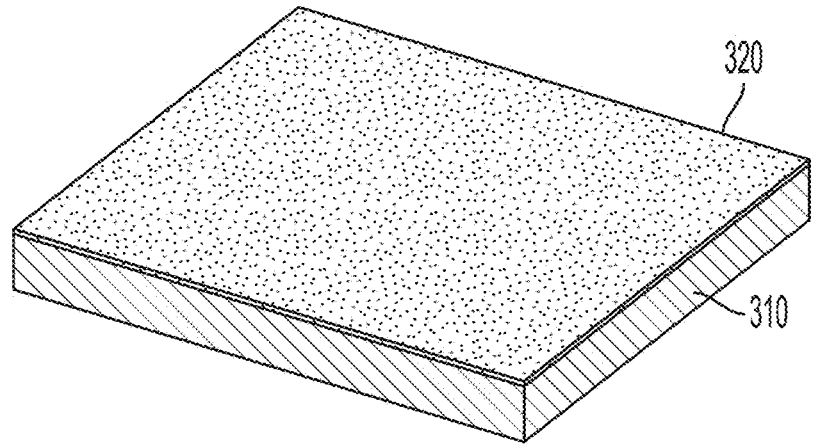
Figure 3C:
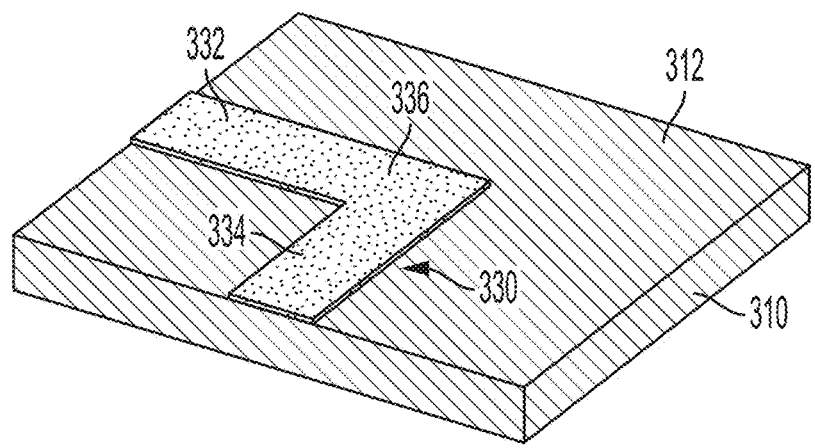

FIGS. 3A-3E illustrate schematic orthogonal views of a method of fabricating a bichromatic grating coupler according to one approach. As shown in FIG. 3A, a substrate layer 310 having an upper surface 312 is provided. The substrate layer 310 includes a first material having a first refractive index (e.g., SiO$_2$). As depicted in FIG. 3B, a waveguide layer 320 is deposited on upper surface 312 of substrate layer 310 such as by a conventional deposition process. The waveguide layer 320 includes a second material having a second refractive index (e.g., SiN) that is higher than the first refractive index. As shown in FIG. 3C, waveguide layer 320 is then etched to form a waveguide structure 330 with a pair of input waveguide arms 332, 334 that meet in an intersecting region 336. The waveguide arms 332, 334 extend to respective adjacent edges of substrate layer 310.

Figure 3D:
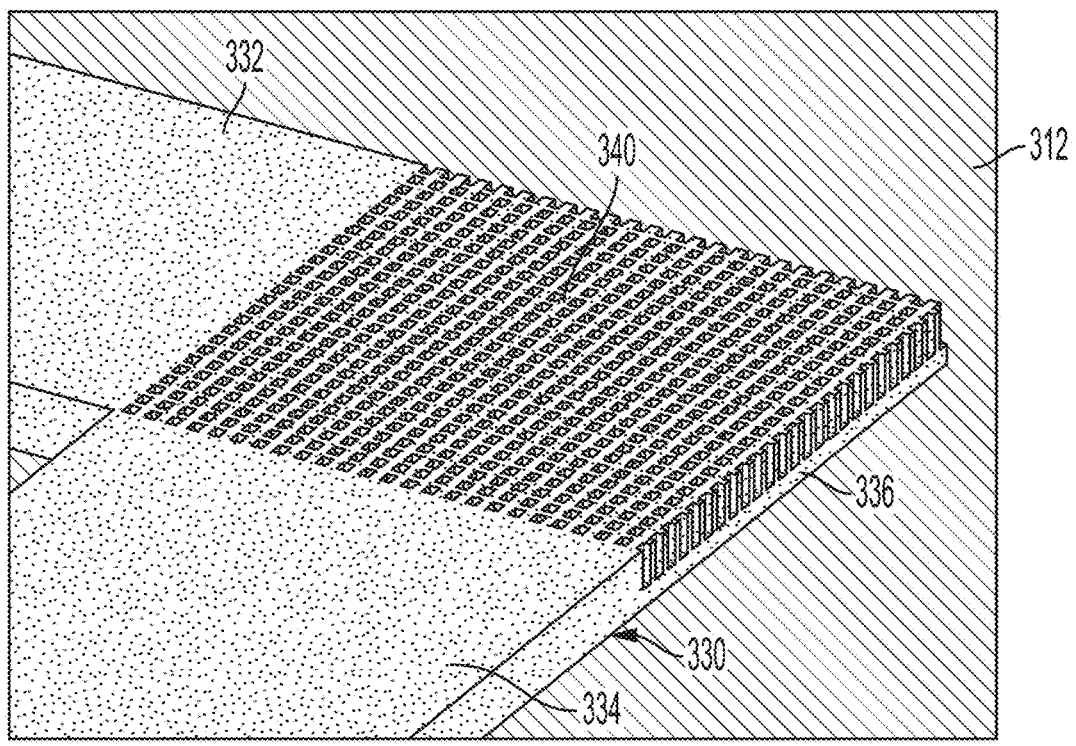

FIG. 3D illustrates an enlarged view of a portion of waveguide structure 330 on upper surface 312 of substrate layer 310, including intersecting region 336 and waveguide arms 332, 334. A two-dimensional diffraction grating structure 340 is formed in intersecting region 336 and includes a first sub-grating and a second sub-grating that are superimposed orthogonally with respect to each other. The first and second sub-gratings can be fabricated together through standard lithography and etching processes.

Figure 3E:
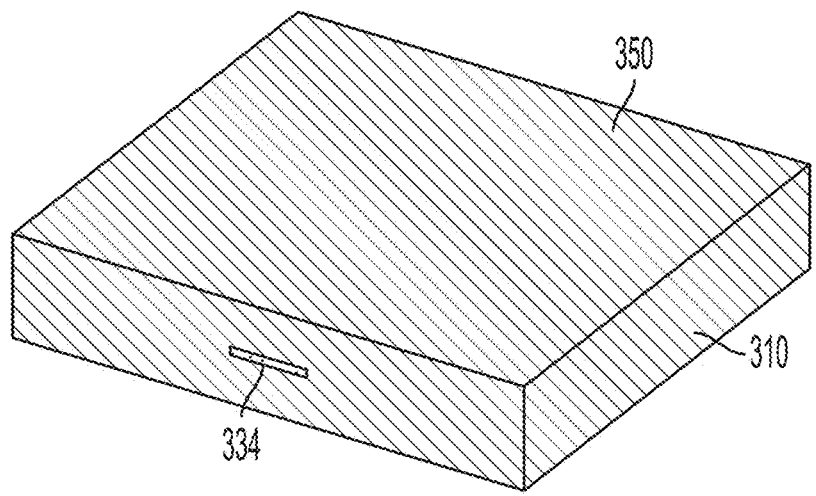

As shown in FIG. 3E, an upper cladding layer 350 is formed over the waveguide structure 330 and upper surface 312 of substrate layer 310, such as by a conventional deposition process, to complete fabrication of the bichromatic grating coupler. The upper cladding layer 350 can include the first material having the first refractive index. The respective ends of waveguide arms 332, 334 are left exposed on adjacent sides of the bichromatic grating coupler to provide input ports for light beams directed to grating 340 through waveguide arms 332, 334.

Figure 4:
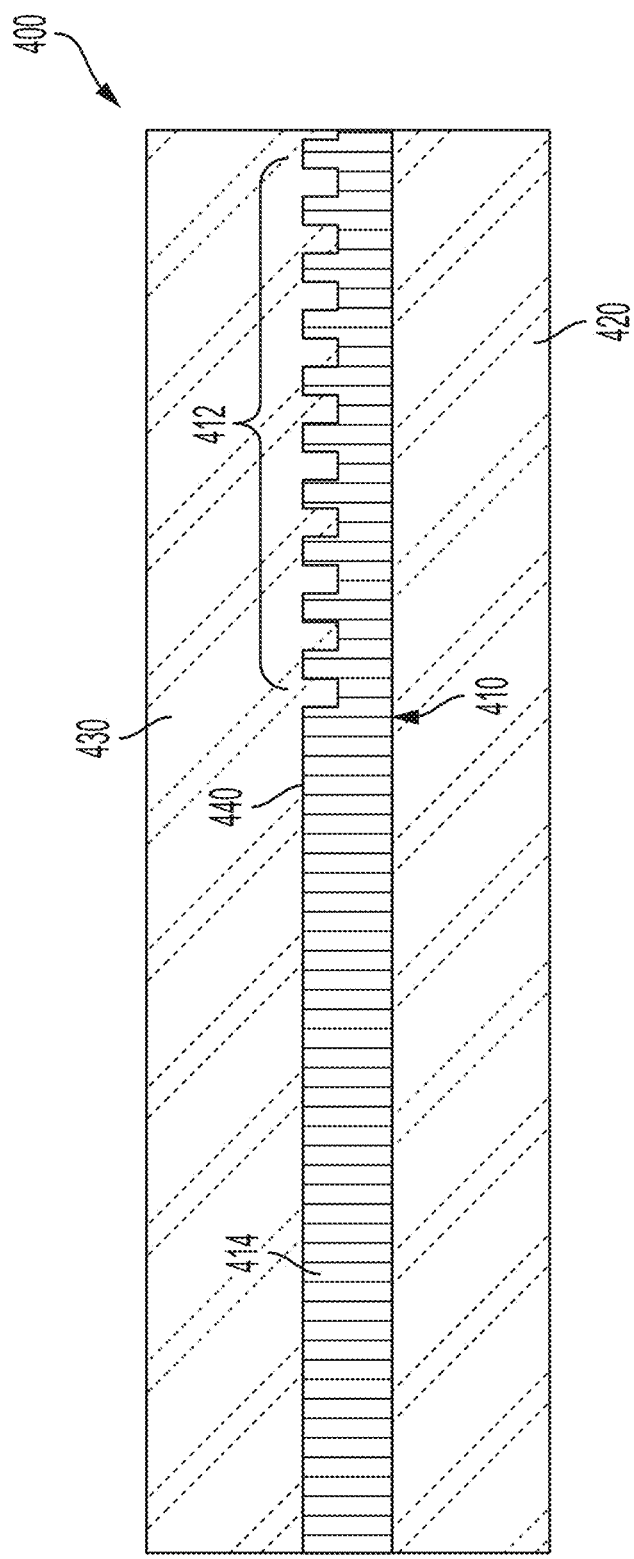
FIG. 4 is a schematic cross-sectional side view of a bichromatic grating coupler, fabricated in a similar manner as shown in FIGS. 3A-3E.

FIG. 4 is a schematic cross-sectional side view of a bichromatic grating coupler 400, which can be fabricated in a similar manner as shown for the bichromatic grating coupler in FIGS. 3A-3E. The bichromatic grating coupler 400 includes a waveguide layer 410 having a two-dimensional diffraction grating structure 412, with first and second sub-gratings, coupled to a first waveguide arm 414 and a second waveguide arm (not shown). The waveguide layer 410 is composed of a higher refractive index material. The waveguide layer 410 is surrounded by a cladding layer that includes a lower cladding portion 420 and an upper cladding portion 430, which are each composed of lower refractive index materials. As shown in FIG. 4, the periodic structures of diffraction grating structure 412 are located on an upper surface boundary 440 between waveguide layer 410 and upper cladding portion 430.

Figure 5:
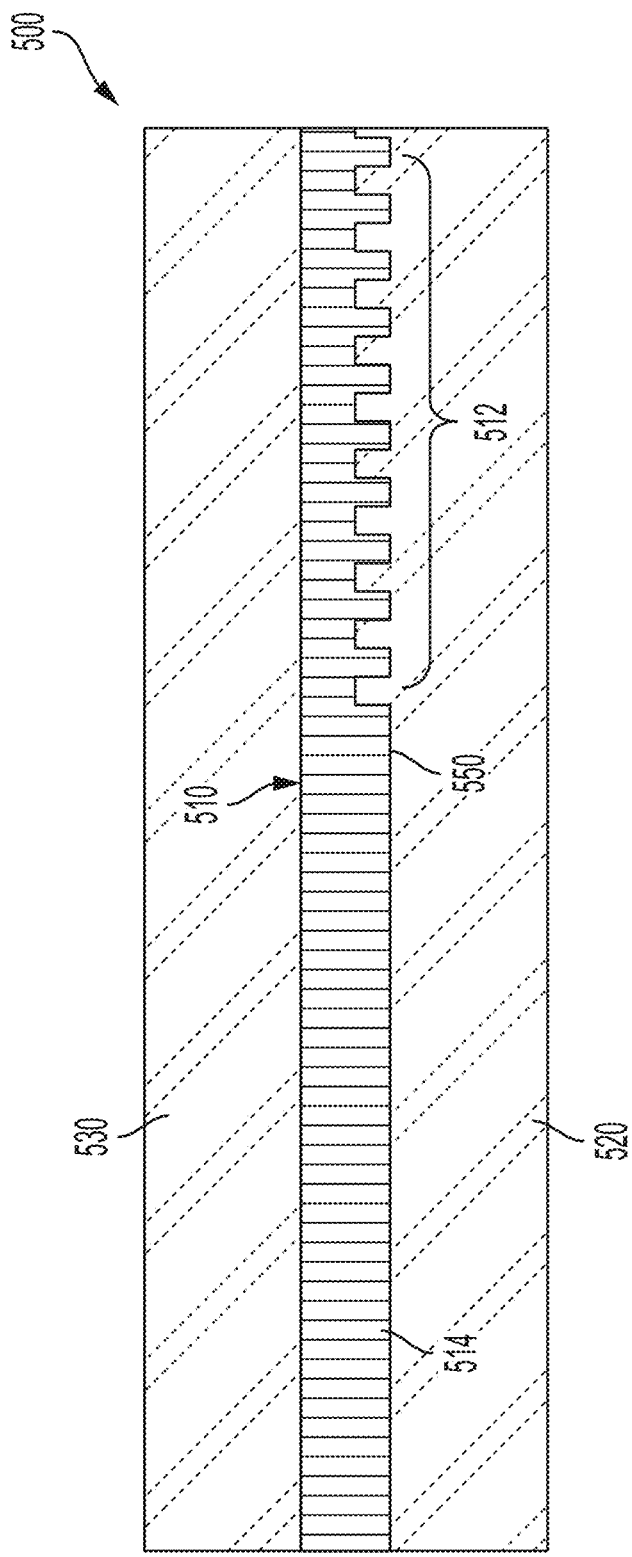
FIG. 5 is a schematic cross-sectional side view of a bichromatic grating coupler, fabricated according to an alternative approach.

FIG. 5 is a schematic cross-sectional side view of a bichromatic grating coupler 500, which can be fabricated in an alternative manner. The bichromatic grating coupler 500 includes a waveguide layer 510 having a two-dimensional diffraction grating structure 512, with first and second sub-gratings, coupled to a first waveguide arm 514 and a second waveguide arm (not shown). The waveguide layer 510 is composed of a higher refractive index material. The waveguide layer 510 is surrounded by a cladding layer that includes a lower cladding portion 520 and an upper cladding portion 530, which are each composed of lower refractive index materials. As shown in FIG. 5, the periodic structures of diffraction grating structure 512 are located on a lower surface boundary 550 between waveguide layer 510 and lower cladding portion 520. Such a configuration can be formed by etching periodic structures in lower cladding portion 520 prior to deposition of waveguide layer 510 thereover.

Figure 6:
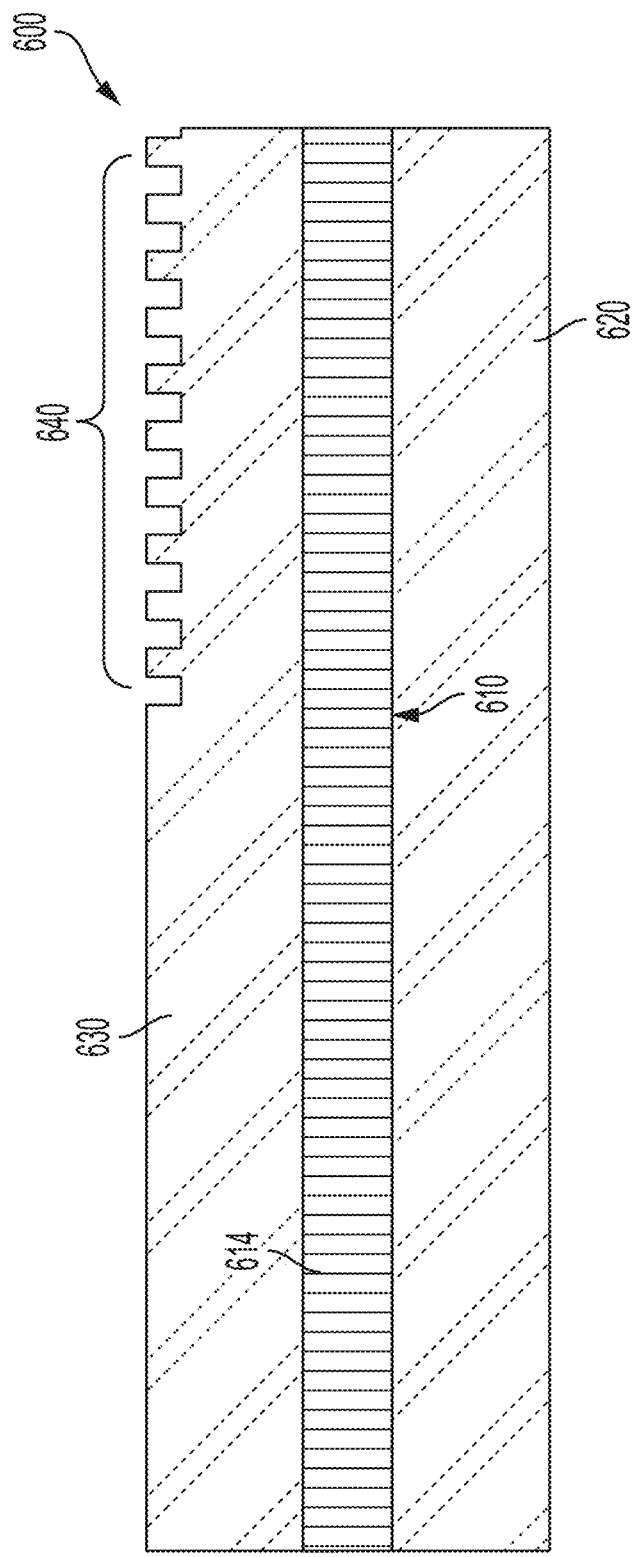
FIG. 6 is a schematic cross-sectional side view of a bichromatic grating coupler, fabricated according to a further alternative approach.

FIG. 6 is a schematic cross-sectional side view of a bichromatic grating coupler 600, which can be fabricated in another alternative manner. The bichromatic grating coupler 600 includes a waveguide layer 610 that includes a first waveguide arm 614 and a second waveguide arm (not shown). The waveguide layer 610 is composed of a higher refractive index material. The waveguide layer 610 is surrounded by a cladding layer that includes a lower cladding portion 620 and an upper cladding portion 630, which are each composed of lower refractive index materials. As shown in FIG. 6, periodic structures of a diffraction grating structure 640 can be formed on an outer surface region of upper cladding portion 630.

Figure 7B:
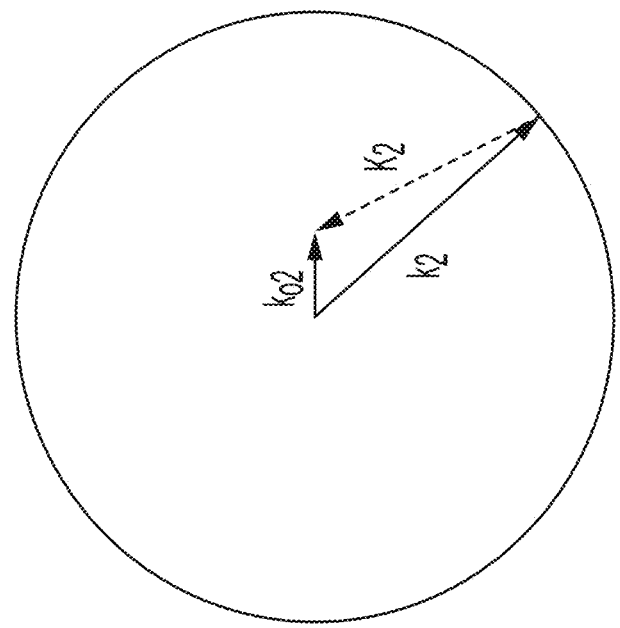
FIGS. 7A and 7B depict k-space vector diagrams for an exemplary bichromatic grating coupler.
Figure 7A:
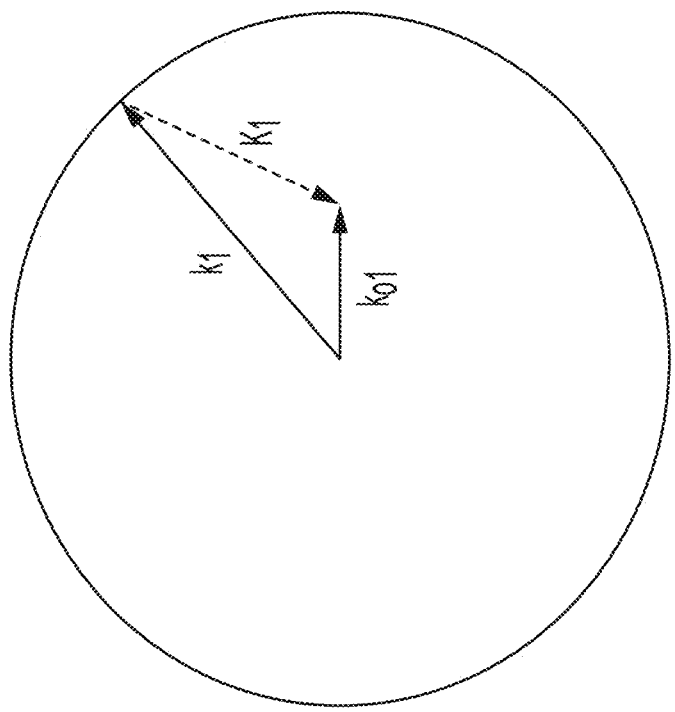

FIGS. 7A and 7B depict k-space vector diagrams for an exemplary bichromatic grating coupler, which includes a two-dimensional diffraction grating structure having a first sub-grating and a second sub-grating that are superimposed with respect to each other.

The diagram of FIG. 7A represents that in k-space, there is a fixed magnitude of the optical k-vector (k1) that light can have at a first wavelength propagating in an initial first direction, and a desired output k-vector (ko1) after diffraction. The grating K-vector (K1) indicates the sub-grating that is needed such that the light input along k1 is output along ko1.

The diagram of FIG. 7B represents that in k-space, there is a fixed magnitude of the optical k-vector (k2) that light can have at a second wavelength propagating in a different initial second direction, and a desired output k-vector (ko2) after diffraction. The grating K-vector (K2) indicates the sub-grating that is needed such that the light input along k2 is output along ko2.

The first initial optical k-vector ($\vec{k_1}$), at the first wavelength ($\lambda_1$), is represented by the following equation:

$$\vec{k_1} = \left(\frac{2\pi n_1}{\lambda_1}\right)(\cos(\theta_1)\vec{x} + \sin(\theta_1)\vec{y}) \tag{1}$$

where $$\frac{2\pi n_1}{\lambda_1}$$

represents the magnitude and $(\cos(\theta_1)\vec{x}+\sin(\theta_1)\vec{y})$ represents the direction of the light propagating in an upward (x) direction, $n_1$ is a first effective refractive index of the waveguide mode at the first wavelength, and $\theta_1$ is the initial angle of propagation of the light at the first wavelength.

The second initial optical k-vector ($\vec{k_2}$), at the second wavelength ($\lambda_2$), is represented by the following equation:

$$\vec{k_2} = \left(\frac{2\pi n_2}{\lambda_2}\right)(\cos(\theta_2)\vec{x} - \sin(\theta_2)\vec{y}) \tag{2}$$

where $$\frac{2\pi n_2}{\lambda_2}$$

represents me magnitude and $(\cos(\theta_2)\vec{x} - \sin(\theta_2)\vec{y})$ represents the direction of the light propagating in a downward (y) direction, $n_2$ is a second effective refractive index of the waveguide mode at the second wavelength, and $\theta_2$ is the initial angle of propagation of the light at the second wavelength.

The desired output in-plane k-vector $(\vec{k}_{o1})$ of light at the first wavelength is represented by the following equation:

$$\vec{k}_{o1} = \left(\frac{2\pi A}{\lambda_1}\right)\vec{x} \qquad (3)$$

The desired output in-plane k-vector $(\vec{k}_{o2})$ of light at the second wavelength is represented by the following equation:

$$\vec{k}_{o2} = \left(\frac{2\pi A}{\lambda_2}\right)\vec{x} \qquad (4)$$

In equations 3 and 4, $A = \sin \varphi$, where $\varphi$ is the angle of diffraction with respect to the surface normal of the grating coupler.

The K-vector of the first sub-grating is represented by the following equation:

$$\vec{K_1} = \left(\frac{2\pi}{\lambda_1}\right)((n_1\cos(\theta_1) - A)\vec{x} + n_1\sin(\theta_1)\vec{y}) \qquad (5)$$

The K-vector of the second sub-grating is represented by the following equation:

$$\vec{K_2} = \left(\frac{2\pi}{\lambda_2}\right)((n_2\cos(\theta_2) - A)\vec{x} - n_2\sin(\theta_2)\vec{y}) \qquad (6)$$

To ensure that light at the first wavelength $(\lambda_1)$ does not interact to the first order with the second sub-grating, the K-vector of the second sub-grating (K2) needs to be perpendicular to the k-vector (k1) of the first wavelength $(\lambda_1)$. This can be accomplished by taking the dot product (of k1 with K2) and setting it to zero, yielding the following expression:

$$n_2 \cos(\theta_1 + \theta_2) = A \cos(\theta_1) \qquad (7)$$

Similarly, to ensure that light at the second wavelength $(\lambda_2)$ does not interact to the first order with the first sub-grating, the K-vector of the first sub-grating (K1) needs to be perpendicular to the k-vector (k2) of the second wavelength $(\lambda_2)$. This is accomplished by taking the dot product (of k2 with K1) and setting it to zero, yielding the following expression:

$$n_1 \cos(\theta_1 + \theta_2) = A \cos(\theta_2) \qquad (8)$$

Combining expressions 7 and 8 results in a transcendental equation, which can be solved numerically to yield $\theta_2$ as follows:

$$\cos\left(\mathrm{acos}\left(\frac{n_2}{n_1}\cos(\theta_2)\right) + \theta_2\right) = \frac{A}{n_1}\cos(\theta_2) \qquad (9)$$

Equation 9 can be solved numerically and used to solve in turn for $\theta_1$ using the following equation:

$$\theta_1 = \mathrm{acos}\left(\frac{n_2}{n_1}\cos(\theta_2)\right) \qquad (10)$$

The values from equations 9 and 10 can then be inserted into expressions for the two sub-gratings to generate a mask file used to fabricate the sub-gratings of the bichromatic grating coupler, as the only unknowns in the above expressions are $\theta_1$ and $\theta_2$.

Figure 8A:
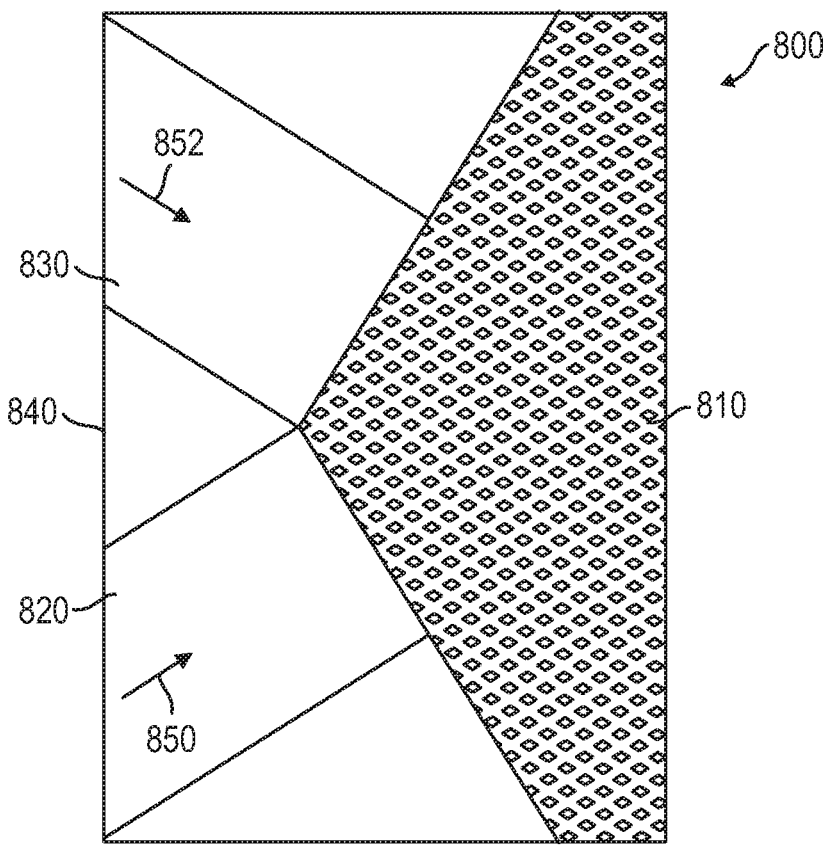
FIG. 8A is a schematic top view of a bichromatic grating coupler, according to another embodiment.
Figure 8B:
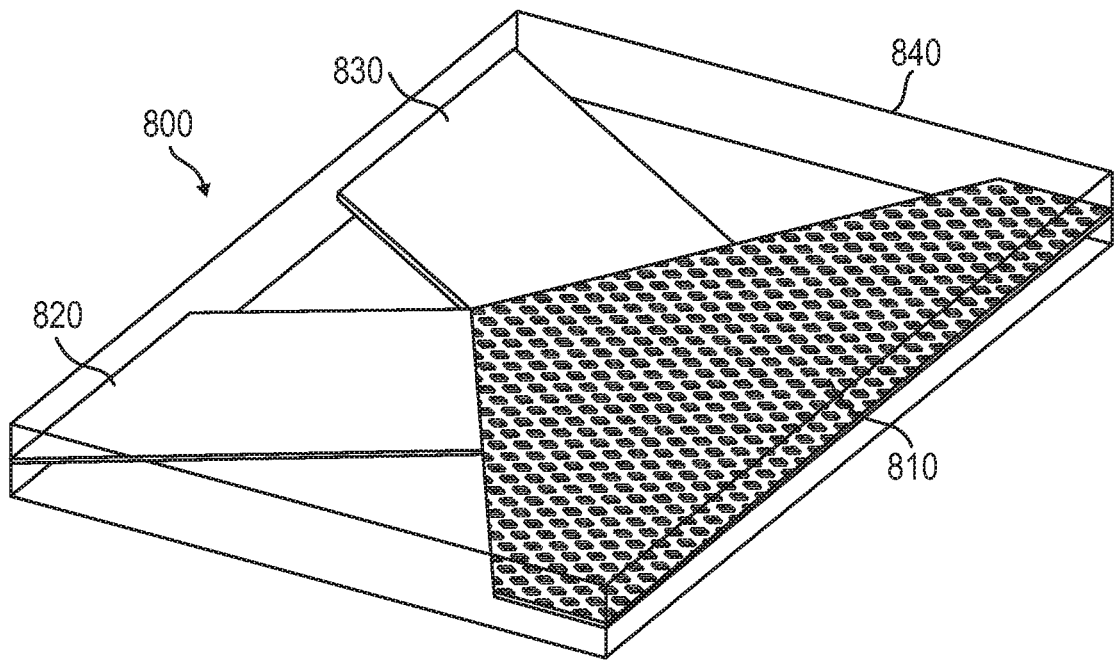
FIG. 8B is a schematic orthogonal view of the bichromatic grating coupler of FIG. 8A.

FIGS. 8A and 8B illustrate schematic views of a bichromatic grating coupler 800, according to another embodiment, which can be designed and fabricated based on the foregoing equations. The bichromatic grating coupler 800 comprises a two-dimensional diffraction grating structure 810 that includes a first sub-grating and a second sub-grating that are superimposed with respect to each other. In this implementation, the first and second sub-gratings are oriented non-orthogonally with respect to each other within diffraction grating structure 810. In other words, the superimposed grating structure is such that one sub-grating is rotated at a non-orthogonal angle with respect to the other sub-grating.

The bichromatic grating coupler 800 also includes a first optical port 820 that is coupled to diffraction grating structure 810 in a first direction, and a second optical port 830 that is coupled to diffraction grating structure 810 in a second direction. In one embodiment, first and second optical ports 820, 830 can be implemented as input planar waveguides, which are each coupled to diffraction grating structure 810 at non-orthogonal angles. The bichromatic grating coupler 800 can also include a cladding layer 840 that surrounds diffraction grating structure 810 and optical ports 820, 830. The diffraction grating structure 810 can be composed of a material have a higher refractive index, and cladding layer 840 can be composed of a material having a lower refractive index.

The bichromatic grating coupler 800 is configured such that a light beam 850 of a first wavelength incident upon diffraction grating structure 810 from first optical port 820 will be diffracted in a first direction by the first sub-grating. A light beam 852 of a second wavelength incident upon diffraction grating structure 810 from second optical port 830 will be diffracted in a second direction by the second sub-grating.

Figure 9A:
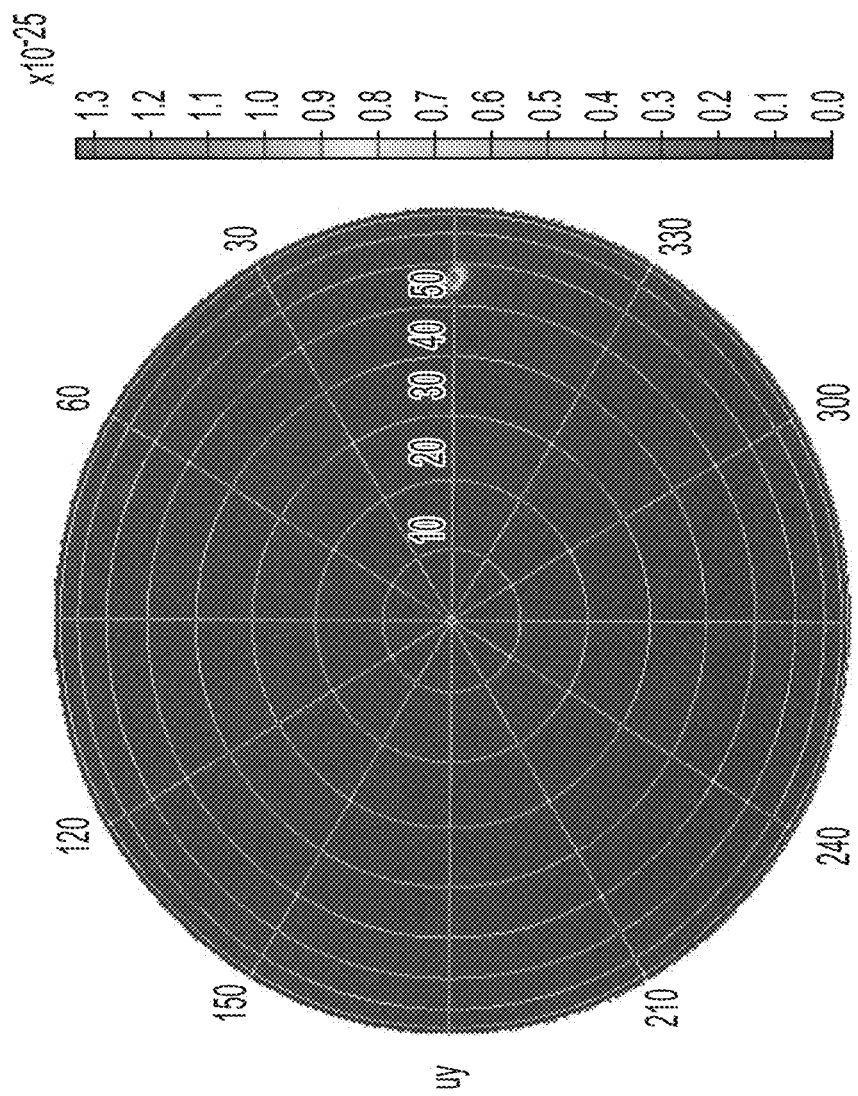
FIGS. 9A and 9B are simulated far-field emission diagrams for the operation of the bichromatic grating coupler of FIGS. 8A-8B.
Figure 9B:
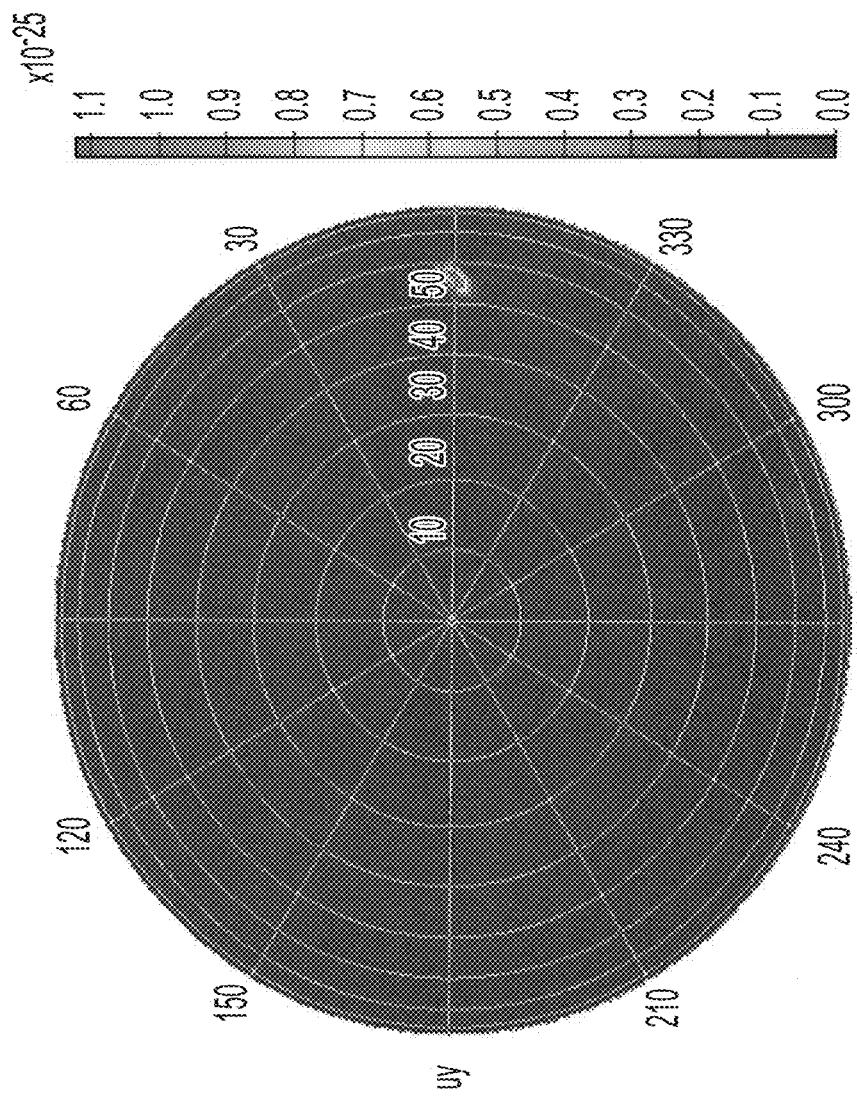

FIGS. 9A and 9B are simulated far-field emission diagrams for the operation of bichromatic grating coupler 800. FIG. 9A shows the simulated far-field emission profile of a light beam at the first wavelength (e.g., 770 nm) injected into first optical port 820. FIG. 9B shows the simulated far-field emission profile of a light beam at the second wavelength (e.g., 790 nm) injected into second optical port 830. In this case, the two sub-gratings are designed such that each of the diffracted beams are emitted at an angle of 55 degrees relative to the surface normal.

Example Embodiments

Example 1 includes a bichromatic grating coupler comprising: a two-dimensional diffraction grating structure comprising: a first sub-grating having a first periodic structure in the diffraction grating structure; and a second sub-grating having a second periodic structure in the diffraction grating structure; wherein the first sub-grating and the second sub-grating are superimposed with respect to each other in the diffraction grating structure; a first optical port coupled to the diffraction grating structure along a first direction; and a second optical port coupled to the diffraction grating structure along a second direction that is different than the first direction; wherein the first optical port is configured to direct a first light beam having a first wavelength to the diffraction grating structure, such that the first light beam is diffracted in a first direction by the first sub-grating; wherein the second optical port is configured to direct a second light beam having a second wavelength to the diffraction grating structure, such that the second light beam is diffracted in a second direction by the second sub-grating.

Example 2 includes the bichromatic grating coupler of Example 1, wherein the first and second sub-gratings include two superimposed Bragg gratings.

Example 3 includes the bichromatic grating coupler of any of Examples 1-2, wherein the first sub-grating has a first K-vector, and the second sub-grating has a second K-vector that is different from the first K-vector.

Example 4 includes the bichromatic grating coupler of any of Examples 1-3, wherein a grating strength of each of the first and second sub-gratings is independently controllable.

Example 5 includes the bichromatic grating coupler of any of Examples 1-4, wherein the first and second sub-gratings are oriented orthogonally with respect to each other within the diffraction grating structure.

Example 6 includes the bichromatic grating coupler of Example 5, wherein the first and second optical ports comprise respective input planar waveguides, which are each coupled to the diffraction grating structure at an orthogonal angle with respect to each other.

Example 7 includes the bichromatic grating coupler of any of Examples 1-4, wherein the first and second sub-gratings are oriented non-orthogonally with respect to each other within the diffraction grating structure.

Example 8 includes the bichromatic grating coupler of Example 7, wherein the first and second optical ports comprise respective input planar waveguides, which are each coupled to the diffraction grating structure at a non-orthogonal angle with respect to each other.

Example 9 includes the bichromatic grating coupler of any of Examples 1-8, further comprising a cladding layer that surrounds the diffraction grating structure, the cladding layer including an upper cladding portion and a lower cladding portion.

Example 10 includes the bichromatic grating coupler of Example 9, wherein the cladding layer comprises a first material having a first refractive index, and the diffraction grating structure comprises a second material having a second refractive index that is higher than the first refractive index.

Example 11 includes the bichromatic grating coupler of Example 9, wherein the periodic structures are located on an upper surface boundary between a waveguide layer and the upper cladding portion.

Example 12 includes the bichromatic grating coupler of Example 9, wherein the periodic structures are located on a lower surface boundary between a waveguide layer and the lower cladding portion.

Example 13 includes the bichromatic grating coupler of Example 9, wherein the periodic structures are located on an outer surface region of the upper cladding portion.

Example 14 includes the bichromatic grating coupler of any of Examples 1-13, wherein the second direction is equal to the first direction.

Example 15 includes the bichromatic grating coupler of any of Examples 1-14, wherein the diffraction grating structure is configured to emit the first and second light beams into free-space.

Example 16 includes the bichromatic grating coupler of any of Examples 1-15, wherein the diffraction grating structure is configured to emit the first and second light beams into free-space at a surface normal, with orthogonal polarizations.

Example 17 includes the bichromatic grating coupler of any of Examples 1-15, wherein the diffraction grating structure is configured to emit the first and second light beams into free-space in independently controllable and steerable directions, with corresponding controllable degrees of polarization misalignment.

Example 18 includes a method of fabricating a bichromatic grating coupler, the method comprising: providing a substrate layer having an upper surface, the substrate layer including a first material having a first refractive index; depositing a waveguide layer on the upper surface of the substrate layer, the waveguide layer including a second material having a second refractive index that is higher than the first refractive index; etching the waveguide layer to form a waveguide structure with a pair of input waveguide arms that meet in an intersecting region; forming a two-dimensional diffraction grating structure in the intersecting region, the diffraction grating structure including a first sub-grating having a first periodic structure and a second sub-grating having a second periodic structure, wherein the first sub-grating and the second sub-grating are superimposed with respect to each other; and forming a cladding layer over the waveguide structure and the upper surface of the substrate layer, the cladding layer including the first material having the first refractive index.

Example 19 includes the method of Example 18, wherein the first material comprises silicon dioxide ($SiO_2$), and the second material comprises silicon nitride (SiN).

Example 20 includes the method of any of Examples 18-19, wherein the first and second sub-gratings include two superimposed Bragg gratings.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A bichromatic grating coupler, comprising:
   a waveguide core layer;
   a diffraction grating structure on a surface of the waveguide core layer, the diffraction grating structure comprising:
      a first sub-grating having a first periodic structure in the diffraction grating structure; and
      a second sub-grating having a second periodic structure in the diffraction grating structure;
      wherein the first sub-grating and the second subgrating are superimposed with respect to each other in the diffraction grating structure;

a first optical port coupled to the diffraction grating structure along a first direction; and a second optical port coupled to the diffraction grating structure along a second direction that is different than the first direction;

wherein the first optical port is configured to direct a first light beam having a first wavelength to the diffraction grating structure, such that the first light beam is diffracted at a first emission angle by the first sub-grating;

wherein the second optical port is configured to direct a second light beam having a second wavelength to the diffraction grating structure, such that the second light beam is diffracted at a second emission angle by the second sub-grating.

2. The bichromatic grating coupler of claim 1, wherein the first and second sub-gratings include two superimposed Bragg gratings.

3. The bichromatic grating coupler of claim 1, wherein the first sub-grating has a first K-vector, and the second sub-grating has a second K-vector that is different from the first K-vector.

4. The bichromatic grating coupler of claim 1, wherein the first and second sub-gratings are oriented orthogonally with respect to each other within the diffraction grating structure.

5. The bichromatic grating coupler of claim 4, wherein the first and second optical ports comprise respective input planar waveguides, which are each coupled to the diffraction grating structure at an orthogonal angle with respect to each other.

6. The bichromatic grating coupler of claim 1, wherein the first and second sub-gratings are oriented non-orthogonally with respect to each other within the diffraction grating structure.

7. The bichromatic grating coupler of claim 6, wherein the first and second optical ports comprise respective input planar waveguides, which are each coupled to the diffraction grating structure at a non-orthogonal angle with respect to each other.

8. The bichromatic grating coupler of claim 1, further comprising a cladding layer that surrounds the waveguide core layer, the cladding layer including an upper cladding portion and a lower cladding portion.

9. The bichromatic grating coupler of claim 8, wherein the cladding layer comprises a first material having a first refractive index, and the waveguide core layer comprises a second material having a second refractive index that is higher than the first refractive index.

10. The bichromatic grating coupler of claim 8, wherein the periodic structures of the diffraction grating structure are located on an upper surface boundary between the waveguide core layer and the upper cladding portion.

11. The bichromatic grating coupler of claim 8, wherein the periodic structures of the diffraction grating structure are located on a lower surface boundary between the waveguide core layer and the lower cladding portion.

12. The bichromatic grating coupler of claim 1, wherein the second emission angle is equal to the first emission angle.

13. The bichromatic grating coupler of claim 1, wherein the diffraction grating structure is configured to emit the first and second light beams into free-space.

* * * * *